US012597697B2

(12) United States Patent
Han et al.

(10) Patent No.: US 12,597,697 B2
(45) Date of Patent: Apr. 7, 2026

(54) SUBSTRATE ON WHICH CONDUCTIVE PATTERN IS ARRANGED, AND ELECTRONIC DEVICE COMPRISING SAME

(71) Applicant: Samsung Electronics Co., Ltd., Suwon-si (KR)

(72) Inventors: Jaehee Han, Suwon-si (KR); Junyun Kim, Suwon-si (KR); Youngkon Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 152 days.

(21) Appl. No.: 18/296,131

(22) Filed: Apr. 5, 2023

(65) Prior Publication Data

US 2023/0246327 A1 Aug. 3, 2023

Related U.S. Application Data

(63) Continuation of application No. PCT/KR2021/014792, filed on Oct. 21, 2021.

(30) Foreign Application Priority Data

Oct. 22, 2020 (KR) ........................ 10-2020-0137747
Mar. 19, 2021 (KR) ........................ 10-2021-0036153

(51) Int. Cl.
*H01Q 1/24* (2006.01)
*H01Q 1/38* (2006.01)
(Continued)

(52) U.S. Cl.
CPC .............. *H01Q 1/243* (2013.01); *H01Q 1/38* (2013.01); *H01Q 7/00* (2013.01); *H04B 5/26* (2024.01); *H04M 1/0277* (2013.01)

(58) Field of Classification Search
USPC ......... 343/702; 361/752, 804, 816, 818, 799
See application file for complete search history.

(56) References Cited

U.S. PATENT DOCUMENTS

| | | | | |
|---|---|---|---|---|
| 10,074,891 B2 * | 9/2018 | Kang | ........................ | H04B 5/26 |
| 10,547,112 B2 * | 1/2020 | Kang | ........................ | H04B 5/26 |

(Continued)

FOREIGN PATENT DOCUMENTS

| | | |
|---|---|---|
| KR | 10-1999-0000301 A | 1/1999 |
| KR | 10-2003-0048374 A | 6/2003 |

(Continued)

OTHER PUBLICATIONS

International Search report and written opinion dated Feb. 7, 2022, issued in International Application No. PCT/KR2021/014792.

(Continued)

*Primary Examiner* — Crystal L Hammond
*Assistant Examiner* — Brandon Sean Woods
(74) *Attorney, Agent, or Firm* — Jefferson IP Law, LLP

(57) ABSTRACT

An electronic device is provided. The electronic device includes a housing including a plate, a printed circuit board arranged inside the housing, a conductive pattern arranged inside the housing and formed to generate a magnetic field, and a base member arranged to be substantially parallel to the plate, the base member includes a first portion having at least one opening, and a second portion extending from the first portion toward the inner side of the at least one opening and including a bending portion formed to be bendable and a contact portion that provides a point of electrical contact with the printed circuit board.

13 Claims, 11 Drawing Sheets

(51) Int. Cl.
    *H01Q 7/00*         (2006.01)
    *H04B 5/26*         (2024.01)
    *H04M 1/02*       (2006.01)

(56)         References Cited

U.S. PATENT DOCUMENTS

| | | | |
|---|---|---|---|
| 2005/0259083 A1 | 11/2005 | Flowers | |
| 2008/0150816 A1 | 6/2008 | Rahola et al. | |
| 2009/0067141 A1* | 3/2009 | Dabov | H05K 9/0026 |
| | | | 361/753 |
| 2009/0266573 A1* | 10/2009 | Engmark | H05K 1/189 |
| | | | 29/830 |
| 2016/0142083 A1 | 5/2016 | Kim et al. | |
| 2016/0210615 A1 | 7/2016 | Lee et al. | |
| 2020/0127404 A1 | 4/2020 | Seo et al. | |
| 2020/0178384 A1 | 6/2020 | Han et al. | |
| 2020/0267834 A1 | 8/2020 | Lee et al. | |
| 2021/0135492 A1 | 5/2021 | Kim et al. | |

FOREIGN PATENT DOCUMENTS

| | | | |
|---|---|---|---|
| KR | 10-2010-0116278 | A | 11/2010 |
| KR | 10-2015-0025968 | A | 3/2015 |
| KR | 10-2016-0057142 | A | 5/2016 |
| KR | 10-2017-0039641 | | 4/2017 |
| KR | 10-2017-0083949 | | 7/2017 |
| KR | 10-2017-0084632 | A | 7/2017 |
| KR | 10-2019-0115888 | | 10/2019 |
| KR | 10-2020-0045661 | | 5/2020 |
| KR | 10-2020-0067270 | | 6/2020 |
| KR | 10-2020-0101809 | | 8/2020 |

OTHER PUBLICATIONS

Extended European Search Report dated Feb. 29, 2024, issued in European Application No. 21883274.9-1224.
Korean Examination Report dated Mar. 2, 2025, issued in Korean Application No. 10-2021-0036153.

\* cited by examiner

SUBSTRATE ON WHICH CONDUCTIVE PATTERN IS ARRANGED, AND ELECTRONIC DEVICE COMPRISING SAME

CROSS-REFERENCE TO RELATED APPLICATION(S)

This application is a continuation application, claiming priority under § 365(c), of an International application No. PCT/KR2021/014792, filed on Oct. 21, 2021, which is based on and claims the benefit of a Korean patent application number 10-2020-0137747, filed on Oct. 22, 2020, in the Korean Intellectual Property Office, and of a Korean patent application number 10-2021-0036153, filed on Mar. 19, 2021, in the Korean Intellectual Property Office, the disclosure of each of which is incorporated by reference herein in its entirety.

BACKGROUND

1. Field

The disclosure relates to a substrate on which a conductive pattern is disposed, and an electronic device including the substrate.

2. Description of Related Art

Owing to the remarkable development of information and communication technology and semiconductor technology, various electronic devices have been increasingly proliferated and used. Electronic devices are under development for use in communication while being carried.

An electronic device may refer to a device performing a specific function according to a loaded program, such as a home appliance, an electronic notebook, a portable multimedia player, a mobile communication terminal, a tablet personal computer (PC), a video/audio device, a desktop/laptop computer, or a car navigation device. For example, these electronic devices may output stored information as sound or an image. As the integration degree of electronic devices increases and ultra-high-speed, large-capacity wireless communication becomes commonplace, a single electronic device such as a mobile communication terminal may be equipped with various functions. For example, not only a communication function but also an entertainment function such as games, a multimedia function such as music/video playback, a communication and security function such as mobile banking, schedule management, and an electronic wallet function are integrated into one electronic device. Such electronic devices are miniaturized so that users may conveniently carry them.

The above information is presented as background information only to assist with an understanding of the disclosure. No determination has been made, and no assertion is made, as to whether any of the above might be applicable as prior art with regard to the disclosure.

SUMMARY

A conductive pattern (e.g., a loop antenna) disposed on a general substrate (e.g., a flexible circuit board) used in an electronic device may include a contact point portion on which a contact point is formed to apply a high frequency signal to a main circuit board. Once the contact point of the conductive pattern is designed and manufactured, the position of the contact point is fixed in correspondence with the position of a contact point on the main circuit board and thus may not be changed. Therefore, since the contact point portion of the conductive pattern designed to a specified length at a specified position may not be commonly used in other products, it should be formed in a different design for each product.

Aspects of the disclosure are to address at least the above-mentioned problems and/or disadvantages and to provide at least the advantages described below. Accordingly, an aspect of the disclosure is to provide a contact point portion of a conductive pattern part including a conductive pattern that is designed to have a variable position, the conductive pattern part may be commonly available for various products.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a plate, a printed circuit board disposed in the housing, a conductive pattern disposed in the housing and configured to generate a magnetic field, and a base member disposed substantially in parallel to the plate. The base member may include a first part having at least one opening formed thereon, a second part including a bent portion extending from the first part into the at least one opening and formed to be bendable, and a contact point portion providing an electrical contact point with the printed circuit board.

In accordance with an aspect of the disclosure, an electronic device is provided. The electronic device includes a housing including a plate, a printed circuit board disposed in the housing, and a conductive pattern part including a base member disposed substantially in parallel to the plate and a conductive pattern disposed on the base member to face the plate and configured to generate a magnetic field. The base member may include a first part having at least one opening formed thereon, a second part including a bent portion extending from the first part to be exposed to the outside of the first part, and a contact point portion providing an electrical contact point with the printed circuit board.

The electronic device according to various embodiments of the disclosure provides a substrate with a conductive pattern accommodated thereon and a structure that allows the position of a contact point of the conductive pattern to be variable.

The electronic device according to various embodiments of the disclosure provides a conductive pattern part commonly available for various products due to a variable position of a contact point.

The electronic device according to various embodiments of the disclosure obviates the need for an additional area for a contact point portion because the contact point portion is located inside a substrate in a design process. Accordingly, material cost may be reduced by increasing the number of openings on a conductive pattern part inside an original plate of a flexible printed circuit board (FPCB).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
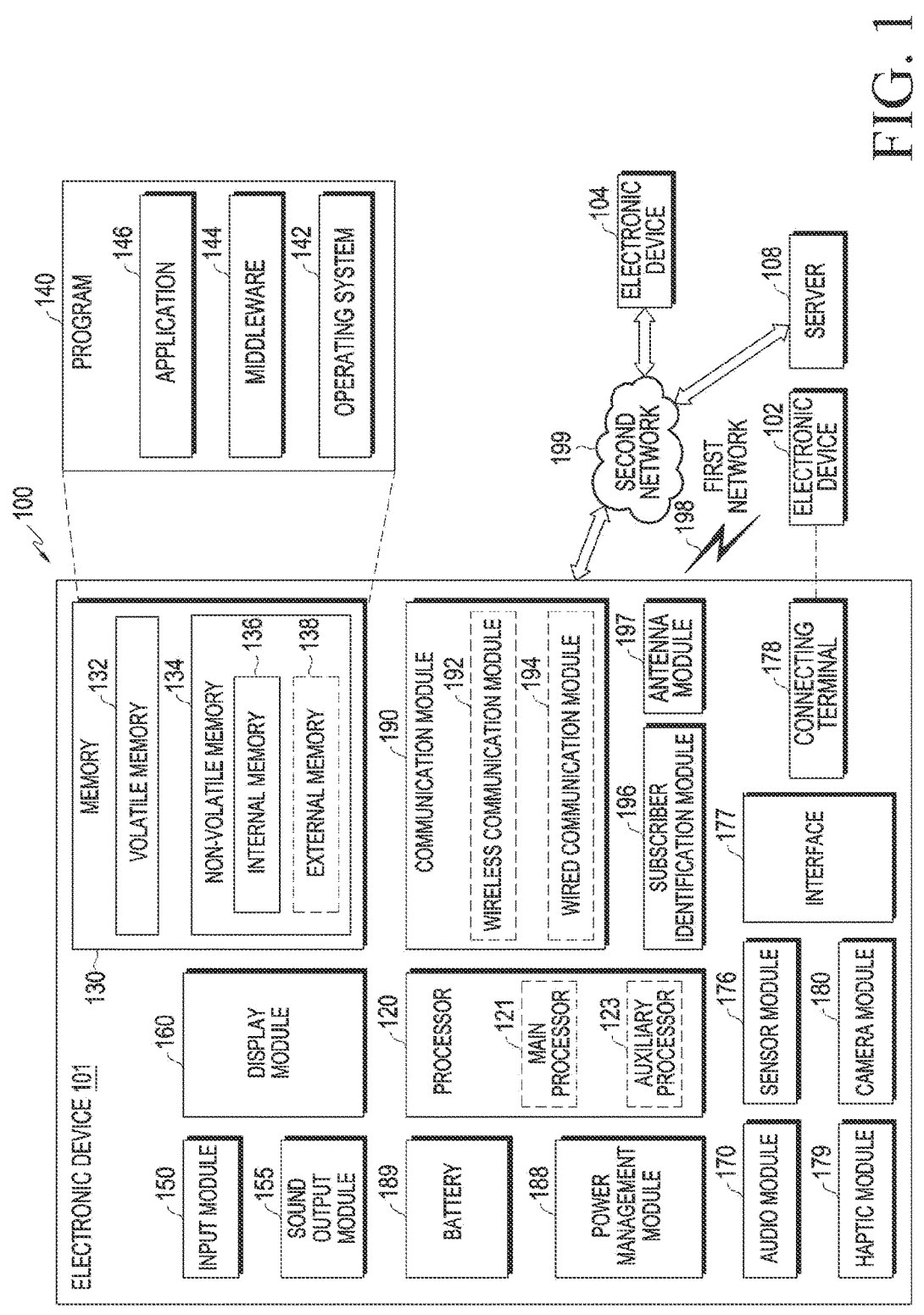
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network) or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly.

According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (e.g., electronic devices 102 and 104 or server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
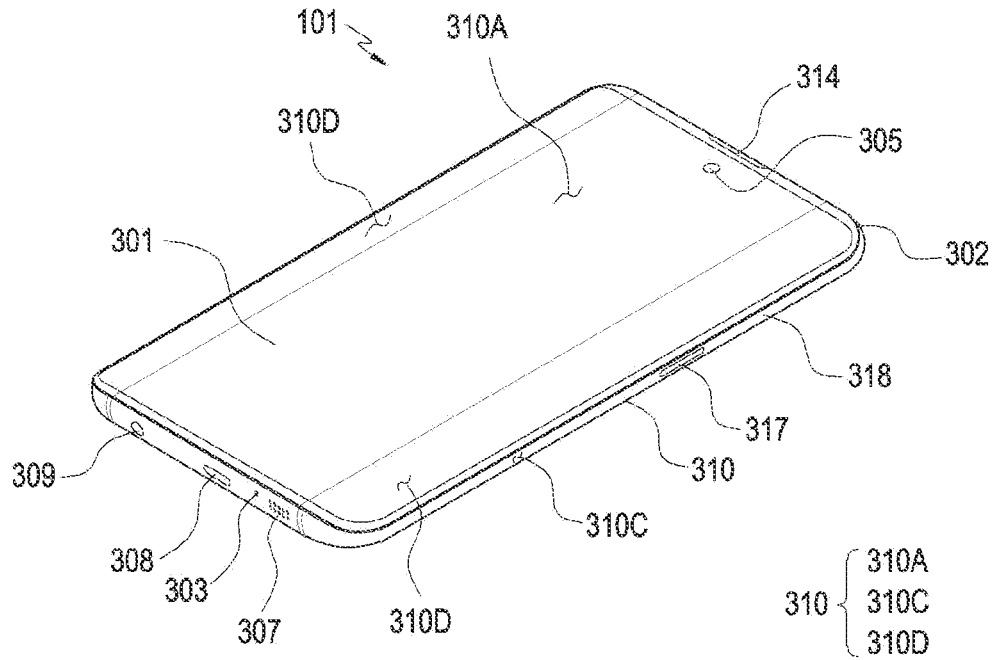
FIG. 2 is a front perspective view illustrating an electronic device according to an embodiment of the disclosure.
Figure 3:
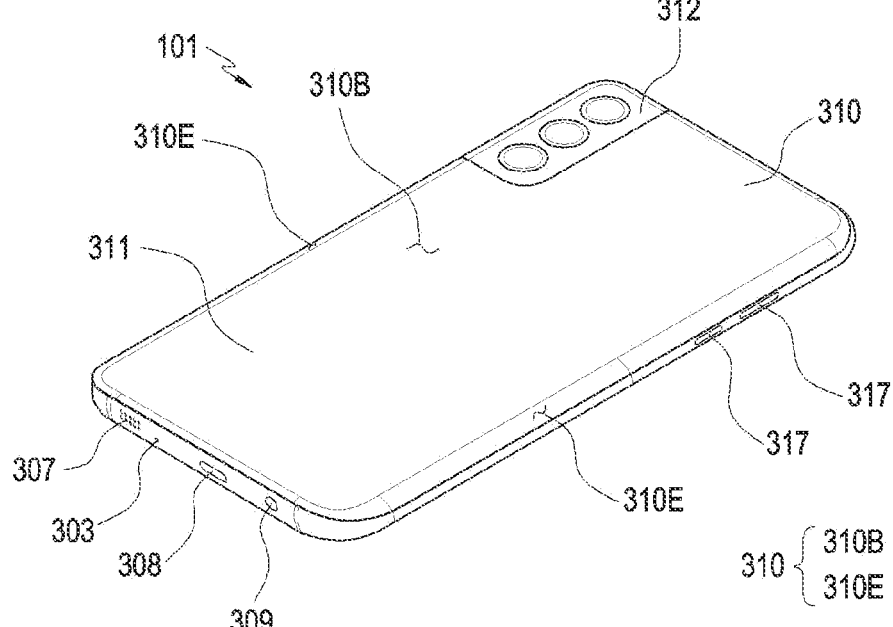
FIG. 3 is a rear perspective view illustrating an electronic device according to an embodiment of the disclosure.

FIG. 2 is a front perspective view illustrating an electronic device according to an embodiment of the disclosure. FIG. 3 is a rear perspective view illustrating an electronic device according to an embodiment of the disclosure.

Referring to FIGS. 2 and 3, an electronic device (e.g., electronic device 101 of FIG. 1) according to an embodiment may include a housing 310 which includes a front surface 310A, a rear surface 310B, and side surfaces 310C surrounding a space between the front surface 310A and the rear surface 310B. In another embodiment (not shown), the housing may refer to a structure that forms part of the front surface 310A, the side surfaces 310C, and the rear surface 310B of FIG. 2. According to an embodiment, at least part of the front surface 310A may be formed by a front plate 302 (e.g., a glass plate or polymer plate including various coating layers) which is substantially transparent. The rear surface 310B may be formed by a rear plate 311. The rear plate 311 may be formed of, for example, glass, ceramic, a polymer, a metal (e.g., aluminum, stainless steel (STS), or magnesium), or a combination of at least two of these materials. The side surfaces 310C may be coupled with the front plate 302 and the rear plate 311 and formed by a side bezel structure (or "side member") 318 including a metal and/or a polymer. In a certain embodiment, the rear plate 311 and the side bezel structure 318 may be integrally formed and include the same material (e.g., glass, a metal material such as aluminum, or ceramic).

In the illustrated embodiment, the front plate 302 may include two first edge areas 310D bent and extending seamlessly from the front surface 310A toward the rear plate 311, at both ends of long edges of the front plate 302. In the illustrated embodiment (refer to FIG. 3), the rear plate 311 may include two second edge areas 310E bent and extending seamlessly from the rear surface 310B toward the front plate 302 at both ends of long edges of the rear plate 311. In a certain embodiment, the front plate 302 (or the rear plate 311) may include only one of the first edge areas 310D (or the second edge areas 310E). In another embodiment, some of the first edge areas 310D or the second edge areas 310E may not be included. In the above embodiments, when viewed from a side of the electronic device 101, the side bezel structure 318 may have a first thickness (or width) on side surfaces without the first edge areas 310D or the second edge areas 310E, and a second thickness smaller than the first thickness on side surfaces with the first edge areas 310D or the second edge areas 310E.

According to an embodiment, the electronic device 101 may include at least one of a display 301, audio modules 303, 307, and 314 (e.g., the audio module 170 of FIG. 1), a sensor module (e.g., the sensor module 176 of FIG. 1), camera modules 305 and 312 (e.g., the camera module 180 of FIG. 1), key input devices 317 (e.g., the input module 150 of FIG. 1), or connector holes 308 and 309 (e.g., the connecting terminal 178 of FIG. 1). In a certain embodiment, the electronic device 101 may not be provided with at least one (e.g., the connector hole 309) of the components or additionally include other components.

According to an embodiment, the display 301 may be visually exposed, for example, through a substantial portion of the front plate 302. In a certain embodiment, at least part of the display 301 may be exposed through the front surface 310A and the front plate 302 forming the first edge areas 310D. In a certain embodiment, the corners of the display 301 may be formed in the same shapes as those of adjacent peripheral portions of the front plate 302 on the whole. In another embodiment (not shown), the gap between the periphery of the display 301 and the periphery of the front plate 302 may be equal on the whole to increase the visually exposed area of the display 301.

According to an embodiment, a surface (or the front plate 302) of the housing 310 may include a view area formed by visual exposure of the display 301. For example, the view area may include the front surface 310A and the first edge areas 310D.

In another embodiment (not shown), a recess or an opening may be formed in part of the view area (e.g., the front surface 310A and the first edge areas 310D) of the display 301, and include at least one audio module (e.g., audio module 314), the sensor module (not shown), a light emitting element (not shown), or the camera module 305, which is aligned with the recess or the opening. In another embodiment (not shown), at least one of the audio module 314, the sensor module (not shown), the camera module 305, a fingerprint sensor (not shown), or the light emitting element (not shown) may be included on the rear surface of the view area of the display 301. In another embodiment (not shown), the display 301 may be incorporated with or disposed adjacent to a touch sensing circuit, a pressure sensor that measures the intensity (pressure) of a touch, and/or a digitizer that detects a magnetic field-based stylus pen. In a certain embodiment, at least some of the key input devices 317 may be disposed in the first edge areas 310D and/or the second edge areas 310E.

According to various embodiments, the first camera module 205 among the camera modules 305 and 312, and/or the sensor module may be disposed in the internal space of the electronic device 101 to communicate with an external environment through a transmissive area of the display 301. According to an embodiment, an area of the display 301 facing a first camera module 305 may be formed to be a transmissive area having a specified transmittance, as part of a content display area. According to an embodiment, the transmissive area may be formed to have a transmittance in a range of about 5% to about 20%. This transmissive area may include an area overlapping with an effective area (e.g., an angle of view area) of the first camera module 305 through which light for generating an image passes to form an image on an image sensor. For example, the transmissive area of the display 301 may include an area having a lower pixel density and/or a lower wiring density than its surrounding area. For example, the transmissive area may replace a recess or an opening.

According to an embodiment, the audio modules 303, 307, and 314 may include, for example, a microphone hole 303 and speaker holes 307 and 314. A microphone for obtaining an external sound may be disposed in the microphone hole 303, and in a certain embodiment, a plurality of microphones may be disposed to detect the direction of a sound. The speaker holes 307 and 314 may include an external speaker hole 307 and a receiver hole 314 for calls. In a certain embodiment, the speaker holes 307 and 314 and the microphone hole 303 may be implemented as a single hole, or a speaker (e.g., a piezo speaker) may be included without the speaker holes 307 and 314. The audio modules 303, 307, and 314 may be designed in various manners such as installation of only some audio modules or addition of a new audio module according to the structure of the electronic device 101, not limited to the above structure.

According to an embodiment, the sensor module (not shown) may generate, for example, an electrical signal or data value corresponding to an internal operation state or external environmental state of the electronic device 101. The sensor module (not shown) may include, for example, a first sensor module (e.g., a proximity sensor) and/or a second sensor module (e.g., a fingerprint sensor) disposed on the front surface 310A of the housing 310, and/or a third sensor module (e.g., a heart rate monitor (HRM) sensor) and/or a fourth sensor module (e.g., a fingerprint sensor) disposed on the rear surface 310B of the housing 310. In a certain embodiment (not shown), the fingerprint sensors may be disposed on the rear surface 310B as well as on the front surface 310A (e.g., the display 301) of the housing 310. The electronic device 101 may further include a sensor module (not shown), for example, at least one of a gesture sensor, a gyro sensor, a barometric pressure sensor, a magnetic sensor, an acceleration sensor, a grip sensor, a color sensor, an IR sensor, a biometric sensor, a temperature sensor, a humidity sensor, or an illuminance sensor. The sensor module may be designed in various manners such as installation of only some sensor modules or addition of a new sensor module according to the structure of the electronic device 101, not limited to the above structure.

According to an embodiment, the camera modules 305 and 312 may include, for example, the first camera module 305 disposed on the front surface 310A of the electronic device 101 and a second camera module 312 disposed on the rear surface 310B of the electronic device 101, and/or a flash (not shown). The camera modules 305 and 312 may include one or more lenses, an image sensor, and/or an image signal processor. The flash (not shown) may include, for example, a light emitting diode (LED) or a xenon lamp. In a certain embodiment, two or more lenses (an IR camera, a wide-angle lens, and a telephoto lens) and image sensors may be arranged on one surface of the electronic device 101. The camera modules 305 and 312 may be designed in various manners such as installation of only some camera modules or addition of a new camera module according to the structure of the electronic device 101, not limited to the above structure.

According to an embodiment, the electronic device 101 may include a plurality of camera modules (e.g., a dual camera or a triple camera) each having a different attribute (e.g., angle of view) or function. For example, a plurality of camera modules 305 and 312 including lenses having different angles of view may be configured, and the electronic device 101 may control to change the angles of view of the camera modules 305 and 312 implemented in the electronic device 101 based on a user selection. For example, at least one of the plurality of camera modules 305 and 312 may be a wide-angle camera, and at least one other camera module may be a telephoto camera. Similarly, at least one of the plurality of camera modules 305 and 312 may be a front camera, and at least one other camera module may be a rear camera. Further, the plurality of camera modules 305 and 312 may include at least one of a wide-angle camera, a telephoto camera, or an IR camera (e.g., a time of flight (TOF) camera or a structured light camera). According to an embodiment, the IR camera may act as at least part of the sensor module. For example, the TOF camera may act as at least part of a sensor module (not shown) for detecting a distance to a subject.

According to an embodiment, the key input devices 317 may be arranged on side surfaces 310C of the housing 310. In another embodiment, the electronic device 101 may not include some or any of the above key input devices 317, and the key input devices 317 which are not included may be implemented in other forms such as soft keys on the display 301. In a certain embodiment, the key input devices may include a sensor module 316 disposed on the rear surface 310B of the housing 310.

According to an embodiment, the light emitting element (not shown) may be disposed, for example, on the front surface 310A of the housing 310. The light emitting element (not shown) may provide, for example, state information about the electronic device 101 in the form of light. In another embodiment, the light emitting element (not shown) may provide a light source interworking, for example, with an operation of the front camera module 305. The light emitting element (not shown) may include, for example, an LED, an IR LED, and/or a xenon lamp.

According to an embodiment, the connector holes 308 and 309 may include a first connector hole 308 that may accommodate a connector (e.g., a universal serial bus (USB) connector) for transmitting and receiving power and/or data to and from an external electronic device, and/or a second connector hole 309 (e.g., an earphone jack) that may accommodate a connector for transmitting and receiving an audio signal to and from an external electronic device.

According to an embodiment, the first camera module 305 among the camera modules 305 and 312, and/or some of sensor modules (not shown) may be disposed to be exposed to the outside through at least part of the display 301. For example, the camera module 305 may include a punch hole camera disposed in a hole or recess formed on the rear surface of the display 301. According to an embodiment, the second camera module 312 may be disposed inside the housing 310 such that a lens is exposed from the rear surface 310B of the electronic device 101. For example, the camera module 312 may be disposed on a printed circuit board (e.g., a printed circuit board 340 of FIG. 4).

According to an embodiment, the first camera module 305 and/or the sensor module may be disposed from the internal space of the electronic device 101 to the front plate 302 of the display 301 to communicate with an external environment through a transparent area. Further, some sensor module 304 may be disposed in the internal space of the electronic device to perform its function without being visually exposed through the front plate 302.

Figure 4:
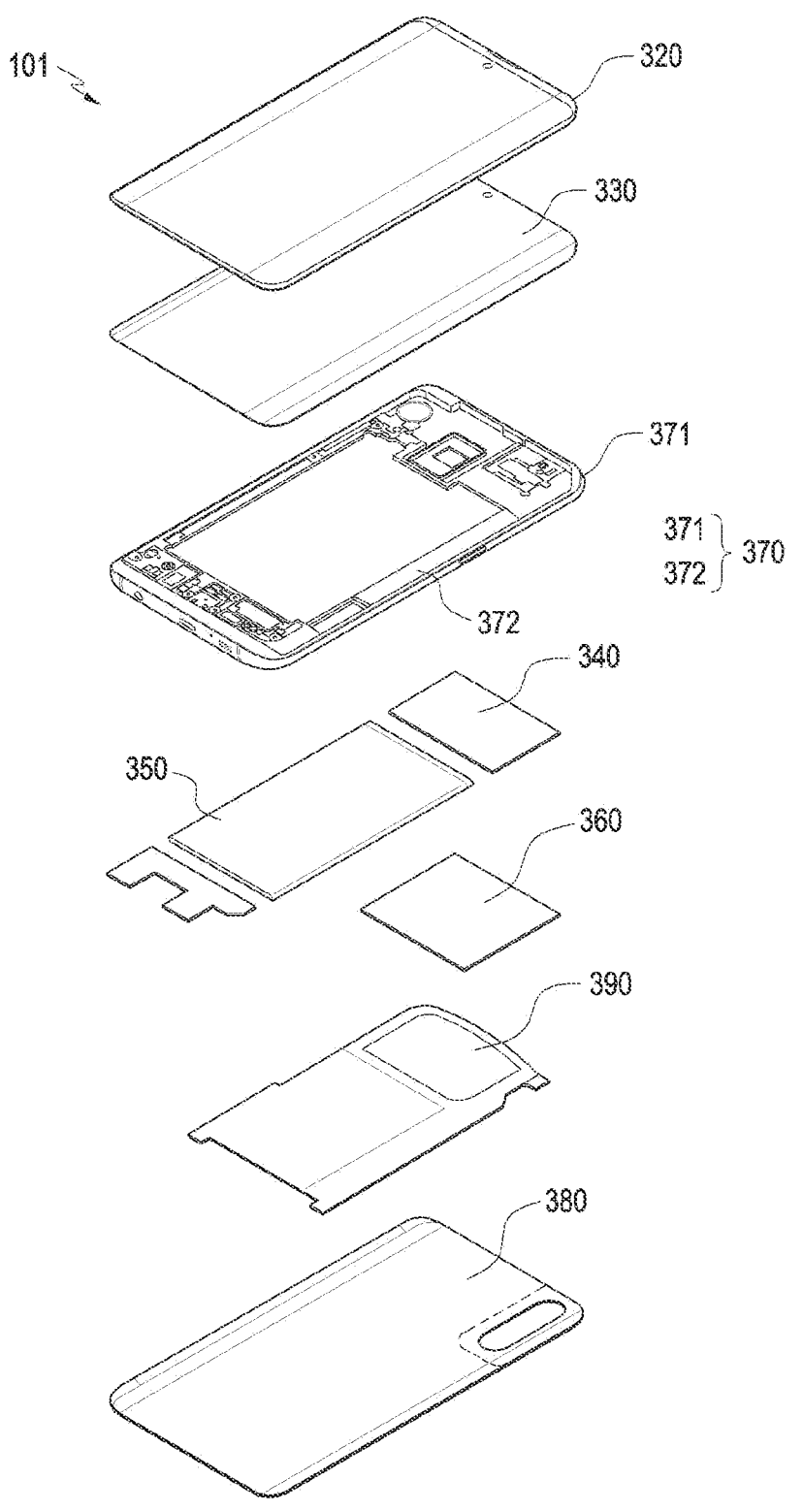
FIG. 4 is an exploded perspective view illustrating an electronic device according to an embodiment of the disclosure.

FIG. 4 is an exploded perspective view illustrating an electronic device according to an embodiment of the disclosure.

Referring to FIG. 4, an electronic device (e.g., electronic device 101 of FIGS. 1 to 3) according to various embodiments may include a support bracket 370, a front plate 320 (e.g., the front plate 302 of FIG. 2), a display 330 (e.g., the display 301 of FIG. 2), the printed circuit board 340 (e.g., a PCB, a flexible PCB (FPCB), or a rigid flexible PCB (RFPCB)), a battery 350 (e.g., the battery 189 of FIG. 1), a second support member 360 (e.g., a rear case), an antenna 390 (e.g., the antenna module 197 of FIG. 1), and a rear plate 380 (e.g., the rear plate 311 of FIG. 2). The support bracket 370 of the electronic device 101 according to an embodiment may include a side bezel structure 371 (e.g., the side bezel structure 318 of FIG. 2) and a first support member 372.

In a certain embodiment, the electronic device 101 may not be provided with at least one (e.g., the first support member 332 or the second support member 360) of the components or additionally include other components. At least one of the components of the electronic device 101 may be the same as or similar to at least one of the components of the electronic device 101 of FIG. 2 or 3, and a redundant description will be avoided below.

According to various embodiments, the first support member 332 may be disposed inside the electronic device 101, and may be connected to or integrally formed with the side bezel structure 318. The first support member 372 may be formed of, for example, a metal material and/or a non-metal (e.g., polymer) material. The first support member 372 may have one surface coupled with the display 330 and the other surface coupled with the printed circuit board 340.

According to various embodiments, the printed circuit board 340 may have a processor, memory, and/or an interface mounted thereon. The processor may include, for example, at least one of a CPU, an application processor, a graphics processor, an image signal processor, a sensor hub processor, or a communication processor. According to various embodiments, the printed circuit board 340 may include an FPCB-type radio frequency cable (FRC). For example, the printed circuit board 340 may be disposed on at least part of the first support member 372 and electrically connected to an antenna module (e.g., the antenna module 197 of FIG. 1) and a communication module (e.g., the communication module 190 of FIG. 1).

According to an embodiment, the memory may include, for example, volatile memory or non-volatile memory.

According to an embodiment, the interface may include, for example, a high definition multimedia interface (HDMI), a universal serial bus (USB) interface, an SD card interface, and/or an audio interface. The interface may, for example, electrically or physically connect the electronic device 101 to an external electronic device, and include a USB connector, an SD card/multimedia card (MMC) connector, or an audio connector.

According to various embodiments, the battery 350 is a device for supplying power to at least one component of the electronic device 101, and may include, for example, a non-rechargeable primary battery, a rechargeable secondary battery, or a fuel cell. At least part of the battery 350 may be disposed substantially on the same plane as the printed circuit board 340, for example. The battery 350 may be disposed integrally inside the electronic device 101 or detachably from the electronic device 101.

According to various embodiments, the second support member 360 (e.g., the rear case) may be disposed between the printed circuit board 340 and the antenna 390. For example, the second support member 360 may include one surface coupled with at least one of the printed circuit board 340 or the battery 350 and the other surface coupled with the antenna 390.

According to various embodiments, the antenna 390 may be disposed between the rear plate 380 and the battery 350. The antenna 390 may include, for example, a near field communication (NFC) antenna, a wireless charging antenna, and/or a magnetic secure transmission (MST) antenna. The antenna 390 may, for example, perform short-range communication with an external device or wirelessly transmit and receive power required for charging to and from the external device. In another embodiment, an antenna structure may be formed by part of the side bezel structure 318 and/or part of the first support member 372 or a combination thereof.

According to various embodiments, the rear plate 380 may form at least part of the rear surface (e.g., the rear surface 310B of FIG. 3) of the electronic device 101.

Figure 5:
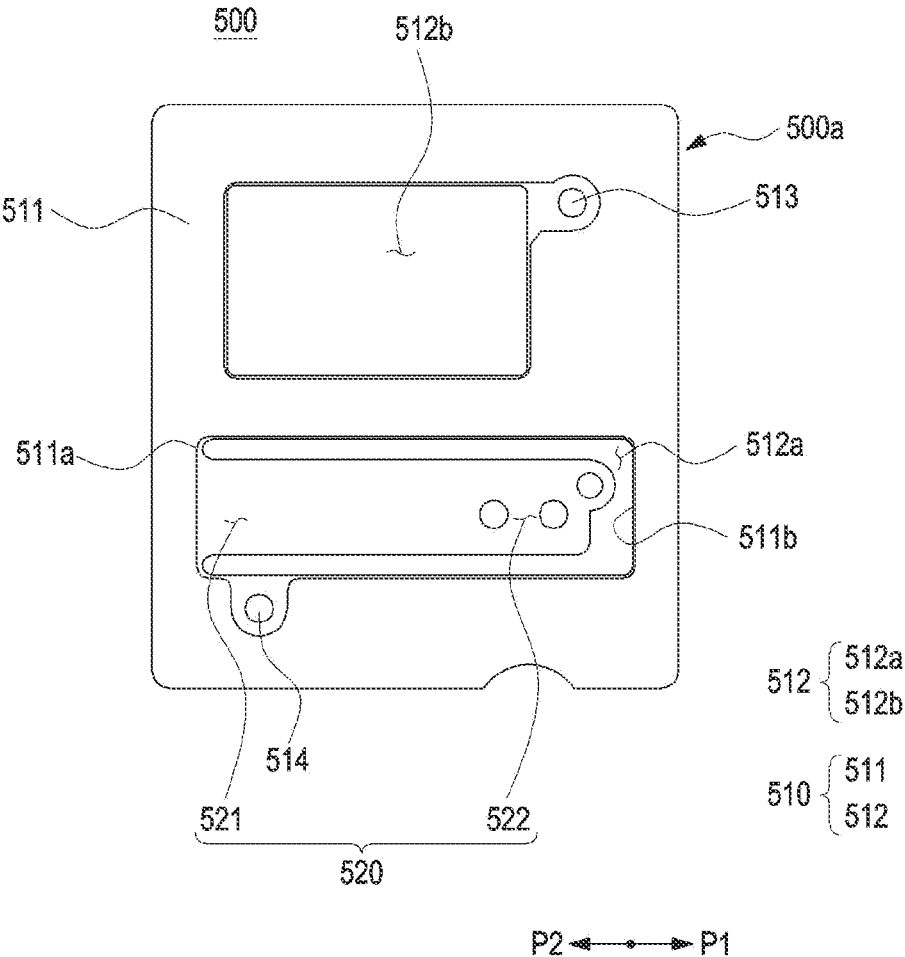
FIG. 5 is a top view illustrating an unbent conductive pattern part according to an embodiment of the disclosure.

FIG. 5 is a top view illustrating an unbent conductive pattern part according to an embodiment of the disclosure.

Figure 6:
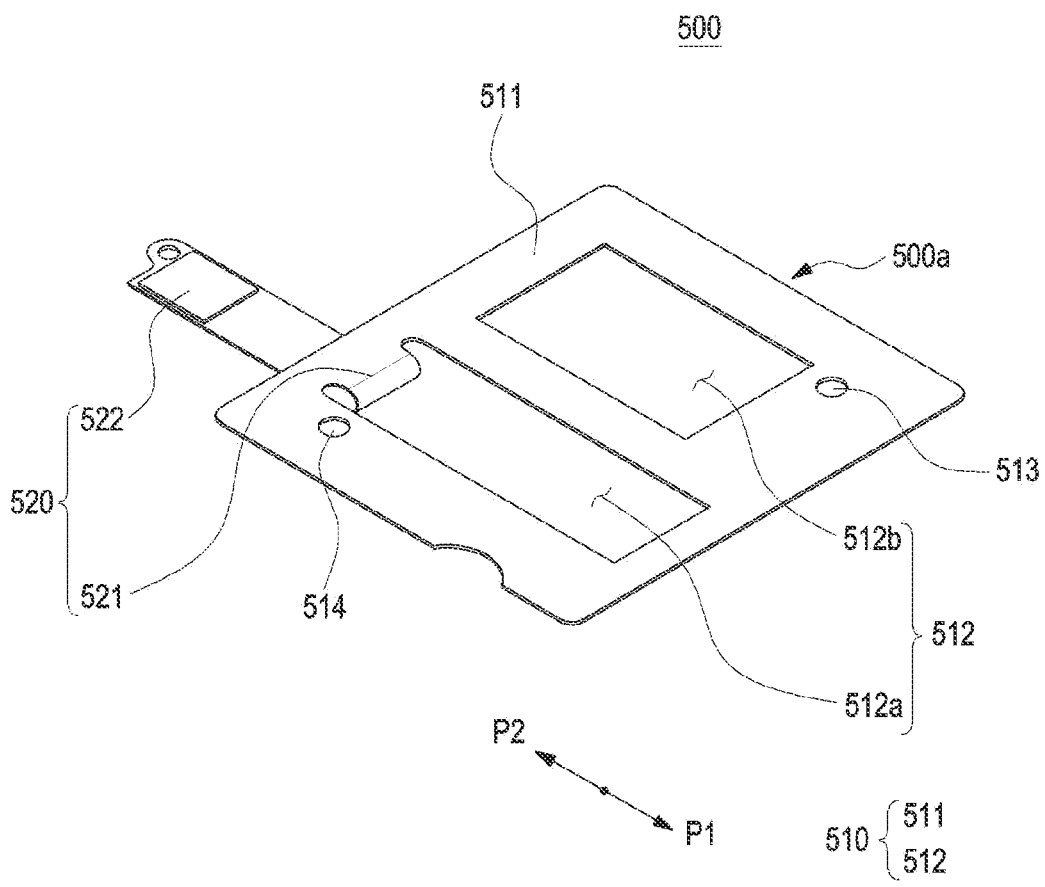
FIG. 6 is a perspective view illustrating a bent conductive pattern part according to an embodiment of the disclosure.

FIG. 6 is a perspective view illustrating a bent conductive pattern part according to an embodiment of the disclosure.

According to various embodiments, an electronic device (e.g., electronic device 101 of FIGS. 1 to 4) may include a housing (e.g., the housing 310 of FIGS. 2 and 3), a circuit board (e.g., the printed circuit board 340 of FIG. 4) disposed in the housing 310, and a conductive pattern part 500. The housing 310 may include a front plate (e.g., the front plate 320 of FIG. 4) and a rear plate (e.g., the rear plate 380 of FIG. 4). The conductive pattern part 500 may include a conductive pattern (e.g., a conductive pattern 500*b* of FIG. 7) formed to generate a magnetic field and/or a base member 500*a* disposed in parallel to at least part of the front plate 320 and/or the rear plate 380.

The configurations of the housing and the circuit board of FIGS. 5 and 6 may be partially or wholly identical to those of the housing of FIGS. 2 and 3 and the printed circuit board 340 of FIG. 4.

According to various embodiments, the base member 500*a* may include a film made of an insulation material or a dielectric material and provide an area in which the conductive pattern 500*b* is formed. For example, the conductive pattern part 500 may be in the shape of a flexible printed circuit board. In another example, the conductive pattern part 500 may have a structure which is both a flexible printed circuit board and a multi-layer circuit board.

According to various embodiments, the base member 500*a* may include a first part 510 including a support area 511 in which the conductive pattern 500*b* is disposed and at least one opening 512, and a second part 520 extending from the at least one opening 512 into the at least one opening 512. According to an embodiment, the shapes of the base member 500*a* may be divided into a first shape for fabrication and a second shape for arrangement in the electronic device 101. The first shape may mean a state where the second part 520 is not bent, and the second shape may mean a state where the second part 520 is bent. FIG. 5 illustrates the first shape, and FIG. 6 illustrates the second shape.

According to an embodiment, the first part 510 of the base member 500*a* may include the support area 511 shaped into a plate and a first opening 512*a*. According to another embodiment, the first part 510 of the base member 500*a* may include the plate-shaped support area 511, the first opening 512*a*, and a second opening 512*b* spaced apart from the first opening 512*a*.

According to various embodiments, the first opening 512*a* may be formed in an area inside the first part 510 and vary in shape depending on whether the second part 520 is bent.

Referring to FIG. 5, in the first shape (e.g., the state where the second part 520 is not bent), the first opening 512*a* may be formed along an edge of the second part 520. For example, when the second part 520 is in the shape of a square plate extending into the first opening 512*a*, the first opening 512*a* may be formed to surround surfaces of the square plate other than an extension portion of the second part, connected to the support area 511. In another example, the support area 511 adjacent to the first opening 512*a* may be spaced apart from the edge of the second part 520 by a specified distance due to the first opening 512*a*. In another example, the first opening 512*a* may be in the shape of '⊏' or '⊐'.

Referring to FIG. 6, in the second shape (e.g., a state where the second part 520 is bent), the first opening 512*a* may be substantially in the shape of a square and open as a whole because the remaining part other than a bent portion 521 of the second part 520 is excluded. For example, one area (e.g., the bent portion 521) of the second part 520, connected to the support area 511 may be disposed adjacent to an end of the first opening 512*a*. Depending on a degree to which the bent portion 521 of the second part 520 is bent, an area in which the second part 520 is located in the first opening 512*a* may be differently adjusted.

According to an embodiment, a first fixing hole 513 to fix the support area may be formed in part of the support area 511 adjacent to the first opening 512*a*.

According to various embodiments, the second opening 512*b* may be formed in an area inside the first part 510. The second opening 512*b* may be spaced apart from the first opening 512*a*. When the conductive pattern 500*b* is designed in the shape of a loop, the second opening 512*b* may be located inside the loop-shaped conductive pattern 500*b*, when viewed from above the conductive pattern part 500. The second opening 512*b* may be formed to correspond to the loop-shaped conductive pattern 500*b*. For example, when the conductive pattern 500*b* is in the shape of a square loop, the second opening 512*b* may be formed in the shape of a closed square.

According to an embodiment, the second opening 512*b* may be located in an area in which the conductive pattern 500*b* is not disposed. For example, as the conductive pattern 500*b* is disposed along an edge of the support area 511 and/or inside the second part 520, the area in which the conductive pattern 500*b* is not located may be excluded in design. The second opening 512*b* may be an unnecessary area in which the conductive pattern 500*b* is not disposed, thereby increasing the number of openings of the conductive pattern part 500 in an FPCB original plate and reduce material cost in manufacture. However, the second opening 512*b* may be selectively excluded in design according to a designer's request. For example, when a new conductive line is required, a circuit such as various conductive lines may be formed in the area instead of the second opening 512*b*.

According to an embodiment, a second fixing hole 514 to fix the support area may be formed in part of the support area 511 adjacent to the second opening 512*b*.

According to various embodiments, the second part 520 of the base member 500*a* may extend into the first opening 512*a* and include the bent portion 521 formed to be bendable and a contact point portion 522 providing an electrical contact point with a circuit board in the housing 310. Some of conductive lines of the conductive pattern 500*b* disposed in the first part 510 may be disposed to extend to the contact point portion 522 through the bent portion 521 of the second part 520.

According to various embodiments, the shape of the second part 520 may be different depending on whether the bent portion 521 is bent. Referring to FIG. 5, in the first shape (e.g., the state where the second part 520 is not bent), the bent portion 521 and the contact point portion 522 of the second part 520 may be located inside the first opening 512*a*. For example, the bent portion 521 of the second part 520 may be connected to the support area 511 of the first part 510 and be in a flat state.

According to an embodiment, the support area 511 may include a first inner end portion 511*a* located to contact the first opening 512*a* and a second inner end portion 511*b* located opposite to the first inner end portion 511*a*. The bent portion 521 of the second part 520 may be located near the first inner end portion 511*a*. The contact point portion 522 of the second part 520 may be located to face a first direction P1 toward the second inner end portion 511*b*. In another example, the bent portion 521 of the second part 520 may be connected to the support area 511 to be adjacent to the first inner end portion 511*a*, and the contact point portion 522 of the second part 520 may face the support area 511 while being spaced apart from the support area 511.

Referring to FIG. 6, in the second shape (e.g., the state where the second part 520 is bent), the bent portion 521 of the second part 520 may be bent, and the contact point portion 522 of the second part 520 may be located to face a second direction P2 opposite to the first direction P1. For example, the contact point portion 522 of the second part 520 and its adjacent part may be displaced from the first opening 512*a* and extend to the outside of the first part 510 to form a contact point with the circuit board.

According to an embodiment, the bent portion 521 of the second part 520 may be bent to control the contact point portion 522 of the second part 520 to be movable in the first direction P1 and/or the second direction P2. For example, in the second shape (e.g., in the state where the second part 520 is bent), the position of the contact point portion 522 facing in the second direction P2 (or along a horizontal axis) may be adjusted by adjusting a bending degree or bending length of the bent portion 521. Since the position of a circuit board and/or the position of a contact point of the circuit board varies in each electronic device 101, the bending degree or bending length of the bent portion 521 may be adjusted in correspondence with the position to change the position of the contact point portion 522 of the second part 520.

According to an embodiment, the contact point portion 522 of the second part 520 may connect the conductive pattern 500*b* to a control circuit or a communication module mounted on the circuit board of the electronic device 101. For example, the contact point portion 522 of the second part 520 may include a plurality of holes and be connected to the control circuit or communication module through a connection member such as a connector, a pogo-pin, and a c-clip disposed on the circuit board.

Figure 7:
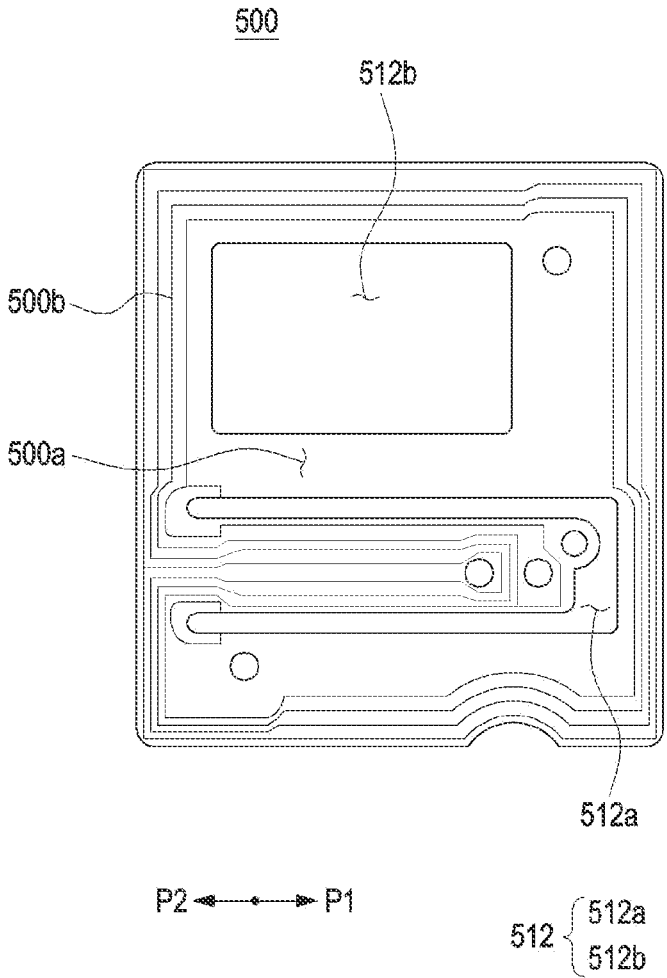
FIG. 7 is a projection view illustrating a base member on which a conductive pattern is mounted according to an embodiment of the disclosure.

FIG. 7 is a top projection view illustrating a base member on which a conductive pattern is mounted according to an embodiment of the disclosure.

According to various embodiments, an electronic device (e.g., electronic device 101 of FIGS. 1 to 4) may include a housing (e.g., housing 310 of FIGS. 2 and 3), a circuit board (e.g., the printed circuit board 340 of FIG. 4) disposed inside the housing 310, and the conductive pattern part 500. The conductive pattern part 500 may include the conductive pattern 500*b* formed to generate a magnetic field and the base member 500*a* to accommodate the conductive pattern 500*b* thereon.

The configurations of the housing and the circuit board of FIG. 7 may be partially or wholly identical to those of the housing of FIGS. 2 and 3 and the printed circuit board 340 of FIG. 4. The configuration of the conductive pattern part 500 of FIG. 7 may be partially or wholly identical to that of the conductive pattern part 500 of FIGS. 5 and 6.

According to various embodiments, the base member 500*a* may include a film made of an insulation material or a dielectric material and provide an area (e.g., the support area 511 of the first part 510, and the second part 520 in FIGS. 5 and 6) in which the conductive pattern 500*b* is formed.

According to various embodiments, the conductive pattern part 500 may include at least one conductive pattern 500*b*, and the at least one conductive pattern 500*b* may be disposed on one surface or the other surface of the base member 500*a*. For example, when the base member 500*a* has a multi-layer circuit board structure, one conductive pattern 500*b* may be formed on an appropriate one of layers forming the base member 500*a*, or each of a plurality of conductive patterns 500*b* may be formed on an appropriate one of the layers forming the base member 500*a*. In another example, at least one conductive pattern 500*b* may be formed by etching (e.g., wet etching, dry etching) part of a conductive layer formed on the base member 500*a* by conductive ink-based printing, deposition, painting, and/or plating.

According to an embodiment, the at least one conductive pattern 500*b* may form a loop antenna, and when the loop antenna is in the form of an FPCB, a plurality of loop antennas for communication may be included on one FPCB.

According to an embodiment, the antenna formed of one FPCB may include an NFC loop antenna, an MST loop antenna, and a loop antenna for wireless communication. For example, in an electronic device having both a front surface (e.g., the front surface 310A of FIGS. 2 and 3) and a rear surface (e.g., the rear surface 310B of FIGS. 2 and 3) formed of glass, an FPCB may be located between the rear glass and the inside of the housing. In another example, at least part of the housing facing the at least one conductive pattern 500*b* may include a non-conductive material (e.g., injected plastic) or include an opening. At least part of the FPCB antenna may overlap with a battery inside the terminal.

According to various embodiments, when viewed from above the conductive pattern part 500 (e.g., when the conductive pattern part 500 disposed in the housing 501 is viewed from the rear surface of the electronic device 101), at least part of the conductive pattern 500*b* may be disposed to surround an opening (e.g., the first opening 512*a* and/or the second opening 512*b*) of the base member 500*a*.

According to various embodiments, the at least one conductive pattern 500*b* may be a coil including a plurality of turns substantially parallel to one surface of the plate. For example, a conductive line forming the at least one conductive pattern 500*b* may include a plurality of turns wound to form a closed loop shape including a circle, a polygon, or a combination of a curve and a straight line, and when the base member 500*a* is mounted inside the housing 310, the base member 500*a* may be disposed substantially in parallel to the housing 310 or a plate (e.g., the rear plate 380 of FIG. 4). In another example, when the at least one conductive pattern 500*b* is an MST loop antenna, it may include conductive line(s) wound about 3 to 10 times. According to another embodiment, the FPCB antenna may further include a heat dissipation sheet (e.g., graphite sheet) and a shielding agent (e.g., ferrite).

According to an embodiment, the at least one conductive pattern 500*b* may be connected to a control circuit (e.g., a control circuit in the communication module 190 of FIG. 1) to transmit/receive wireless radio waves or power and generate a magnetic field.

According to various embodiments, when a plurality of conductive patterns 500*b* are disposed in the conductive pattern part 500, each of the conductive patterns 500*b* may be disposed on the same plane or on a different layer. According to an embodiment, even if the plurality of conductive patterns 500*b* are formed on different layers of a multilayer circuit board, when the base member 500*a* is in the shape of a film, the conductive patterns 500*b* may be disposed on substantially the same plane. The plurality of conductive patterns 500*b*, each of which may be in the shape of a closed loop, may be disposed such that the conductive patterns 500*b* are adjacent to each other, some of the conductive patterns 500*b* overlap with each other, while others do not overlap with each other, and/or one conductive pattern 500*b* surrounds another.

According to various embodiments, each of the plurality of conductive patterns 500*b* may transmit/receive radio waves, transmit/receive wireless power, or generate a magnetic field. According to various embodiments, wireless radio waves may be transmitted/received, wireless power may be transmitted/received, or a magnetic field may be generated, through one conductive pattern or a combination of two or more conductive patterns under the control of the control circuit.

According to various embodiments, a matching circuit, a concentration element, and/or a switch element may be disposed on a line connecting the control circuit to the at least one conductive pattern 500*b* to adjust the resonance frequency or magnetic flux distribution of each conductive pattern. For example, when the control circuit includes a wireless charging module and an NFC module, the at least one conductive pattern 500*b* may be connected to one of the wireless charging module and the NFC module using a switch element, thereby allowing the at least one conductive pattern 500*b* to perform one of a wireless charging function and an NFC function. A matching circuit to adjust the operating characteristics of the at least one conductive pattern 500*b* to be suitable for each function may be disposed on a line connecting the at least one conductive pattern 500*b* to each of the wireless charging module and the NFC module.

Figure 8:
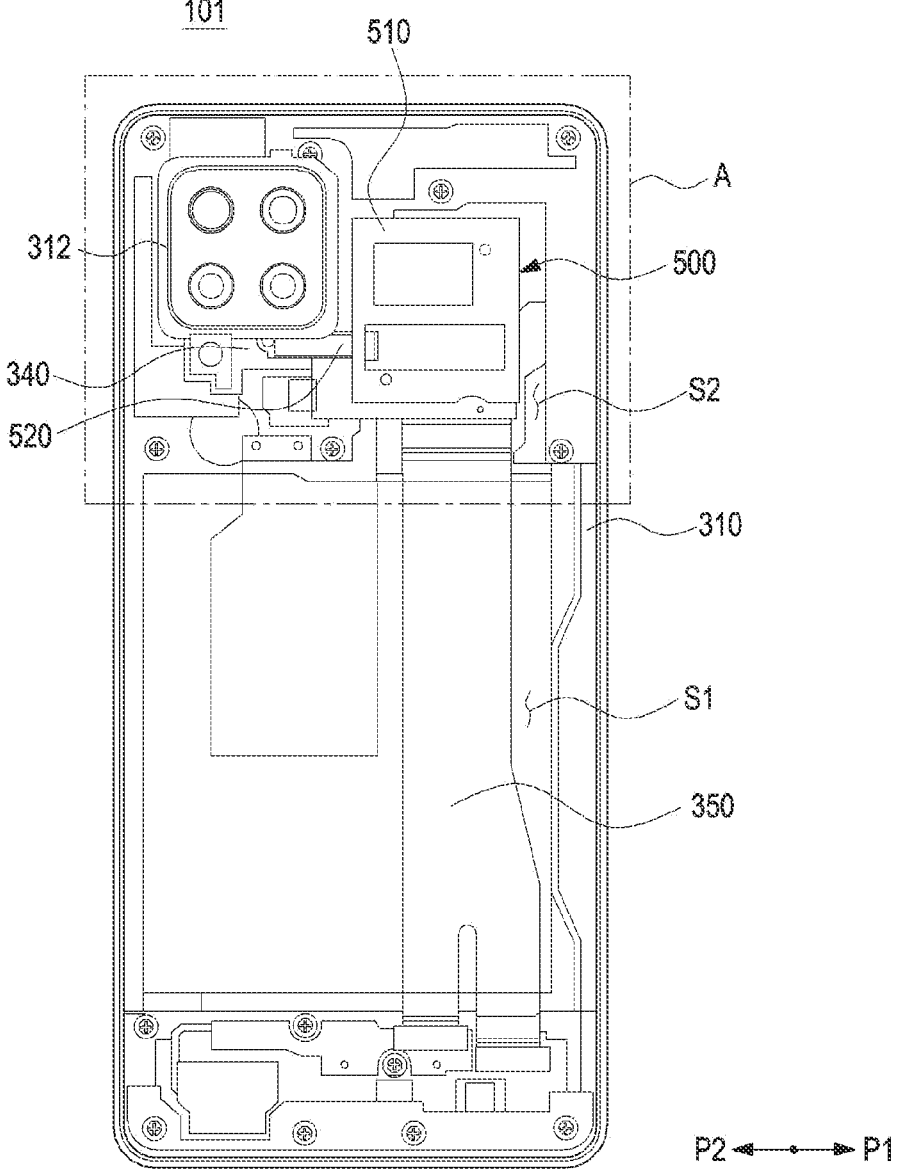
FIG. 8 is a front projection view illustrating the interior of a housing in which a conductive pattern part is mounted in an electronic device according to an embodiment of the disclosure.

FIG. 8 is a front projection view illustrating the interior of a housing in which a conductive pattern part is mounted in an electronic device according to an embodiment of the disclosure.

Figure 9:
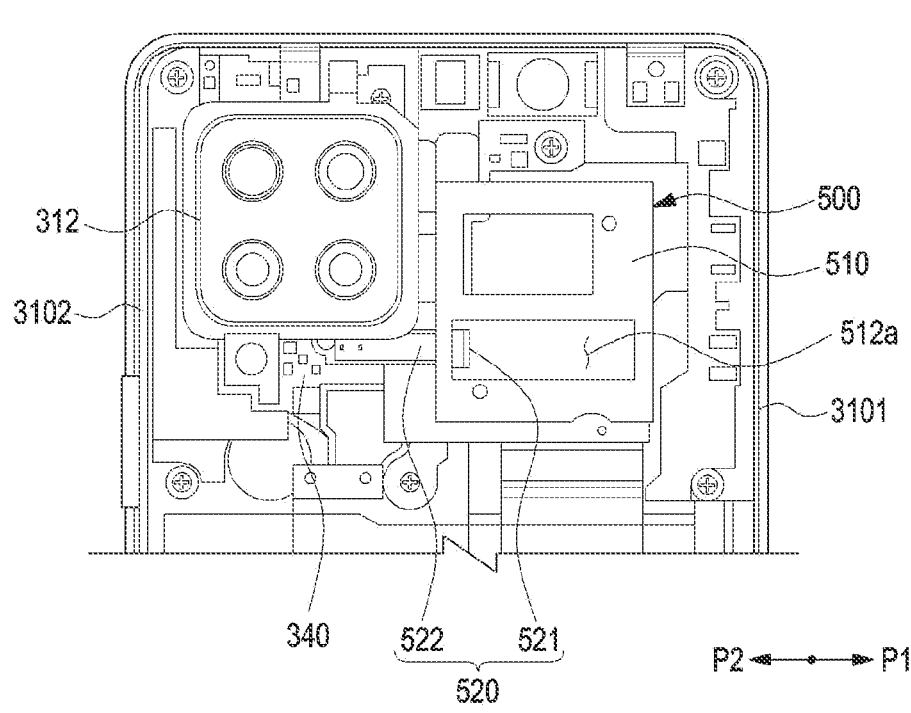
FIG. 9 is an enlarged view illustrating an area A of FIG. 8 according to an embodiment of the disclosure.

FIG. 9 is an enlarged view illustrating an area A of FIG. 8 according to an embodiment of the disclosure.

Figure 10:
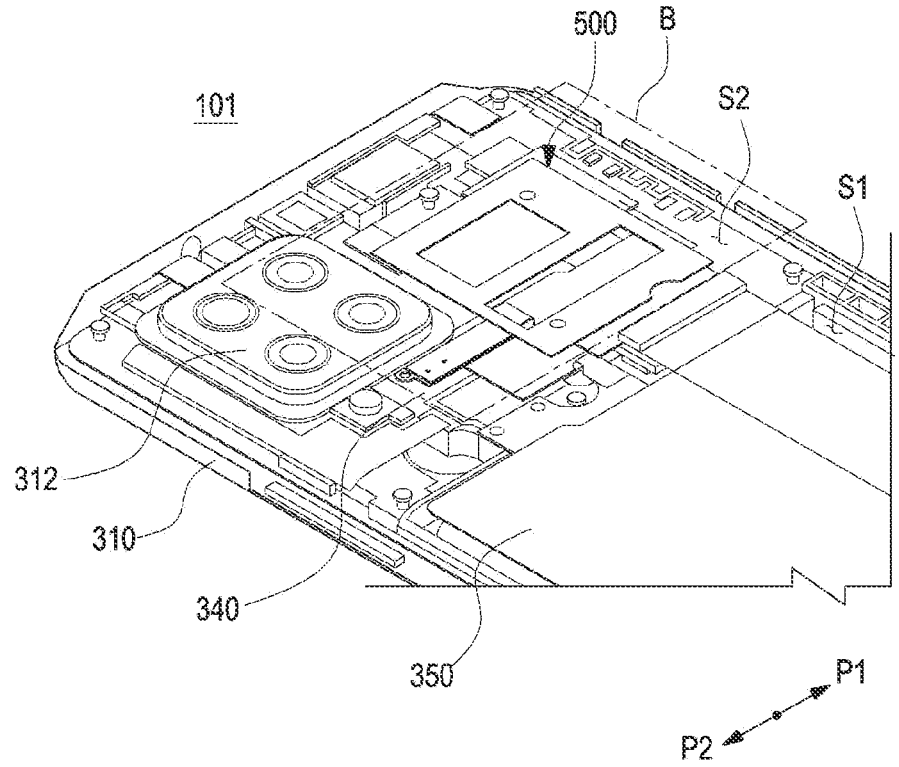
FIG. 10 is a projected perspective view illustrating the interior of a housing in which a conductive pattern part is mounted in an electronic device according to an embodiment of the disclosure.

FIG. 10 is a projected perspective view illustrating the interior of a housing in which a conductive pattern part is mounted in an electronic device according to an embodiment of the disclosure.

Figure 11:
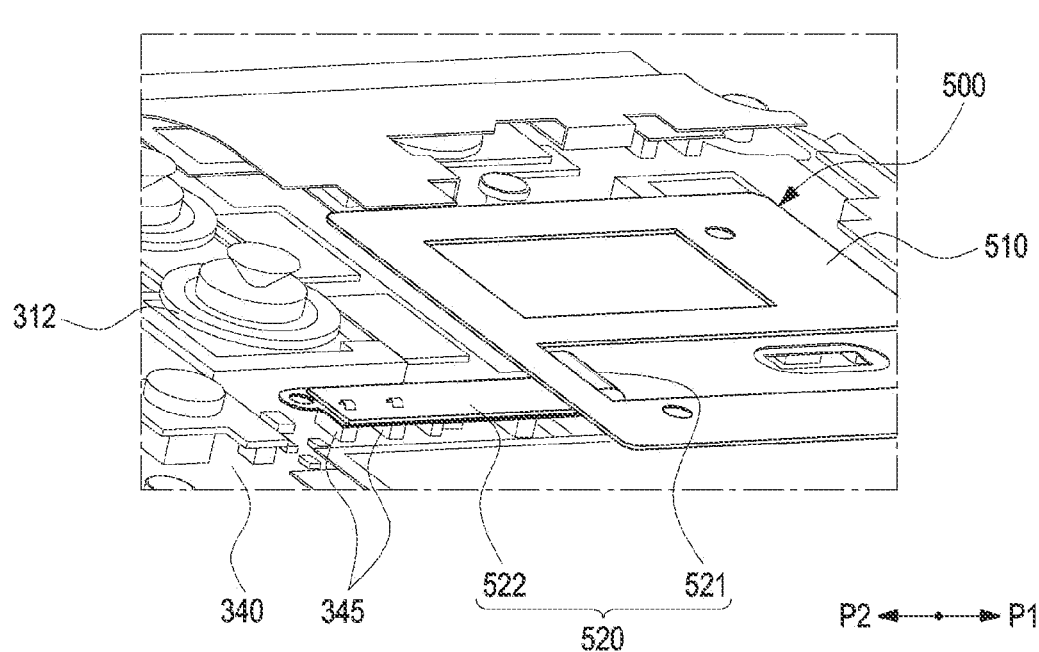
FIG. 11 is an enlarged view illustrating an area B of FIG. 10 according to an embodiment of the disclosure.

FIG. 11 is an enlarged view illustrating an area B of FIG. 10 according to an embodiment of the disclosure.

According to various embodiments, an electronic device (e.g., electronic device 101 of FIGS. 1 to 4) may include a housing (e.g., the housing 310 of FIGS. 2 and 3), the printed circuit board 340 disposed in the housing 310, the battery 350, the camera module 312, and the conductive pattern part 500. The conductive pattern part 500 may include the conductive pattern 500*b* formed to generate a magnetic field and the base member 500*a* to accommodate the conductive pattern (e.g., the conductive pattern 500*b* of FIG. 7).

The configurations of the housing, the battery 350, the camera module 312, and the printed circuit board 340 of FIGS. 8 to 11 may be partially or wholly identical to those of the housing of FIGS. 2 and 3, the battery 350 of FIG. 4, the camera module 312, and the printed circuit board 340. The configuration of the conductive pattern part 500 of FIGS. 8 to 11 may be partially or wholly identical to that of the conductive pattern part 500 of FIGS. 5 to 7.

According to various embodiments, various structures may be formed on the inner surface of the housing 310 according to the arrangement of electronic components inside the electronic device 101 or a coupling structure between the housing 310 and the internal electronic components. The printed circuit board 340, the battery 350, the camera module 312, and the conductive pattern part 500 may be disposed inside the housing 310. For example, the housing 310 may include a first area S1 and a second area S2 defined by the various structures. The first area S1 may provide an area in which the battery 350 is seated, and the second area S2 may provide an area in which the printed circuit board 340, and the camera module 312 and the conductive pattern part 500 adjacent to the printed circuit board 340 are seated.

According to various embodiments, when viewed from above the electronic device 101, at least part of the printed circuit board 340 and the camera module 312 may overlap and be electrically connected to each other. When viewed from above the electronic device 101, at least part of the printed circuit board 340 and the conductive pattern part 500 may overlap and be electrically connected to each other.

According to various embodiments, as the conductive pattern part 500 is electrically connected to the printed circuit board 340 inside the electronic device 101, the second conductive pattern part 500 may be placed in the same state as the second shape (e.g., the state where the second part 520 of FIG. 6 is bent).

According to various embodiments, the base member 500*a* of the conductive pattern part 500 may include the first part 510 to generate a magnetic field and the second part 520 to be electrically connected to the printed circuit board 340. The second part 520 may include the bent portion 521 and the contact point portion 522. The bent portion 521 may be bent from the first part 510 into the first opening 512*a*, and the contact point portion 522 may extend to a contact structure 345 of the printed circuit board 340. For example, the bent portion 521 may be bent from the first direction P1 directed to first side wall 3101 of the housing 310 and extend in the second direction P2 directed to second side wall 3102 of the housing 310. The contact point portion 522 may extend from an end of the bent portion 521 in the second direction P2 and physically contact one area (e.g., the contact structure 345) of the printed circuit board 340.

According to various embodiments, the contact point portion 522 may be formed with two openings connected to a transmission end and a reception end of the conductive pattern 500*b*, respectively. When the contact structure 345 of the printed circuit board 340 is a c-clip, two c-clips may penetrate into the two openings, respectively, to provide electrical contact points.

According to various embodiments, the bent portion 521 of the second part 520 may be bent to control the contact point portion 522 of the second part 520 to be movable in the first direction P1 and/or the second direction P2. For example, in the second shape (e.g., in the state where the second part 520 is bent), the position of the contact point portion 522 in the second direction P2 (along the horizontal axis) may be adjusted by adjusting the bending degree or bending length of the bent portion 521. Because the position of a circuit board and/or the position of a contact point of the circuit board is different in each electronic device 101, the position of the contact point portion 522 of the second part 520 may be changed by adjusting the bending degree or length of the bent portion 521 in correspondence with the position.

An electronic device (e.g., electronic device 101 of FIGS. 1 to 4) according to various embodiments of the disclosure may include a housing (e.g., the housing 310 of FIGS. 2 and 3) including a plate (e.g., the rear plate 380 of FIG. 4), a printed circuit board (e.g., the printed circuit board 340 of FIG. 4) disposed in the housing, a conductive pattern (e.g., the conductive pattern 500*b* of FIG. 7) disposed in the housing and configured to generate a magnetic field, and a base member (e.g., the base member 600*a* of FIG. 6) disposed substantially in parallel to the plate. The base member may include a first part (e.g., the first part 510 of FIG. 6) having at least one opening formed thereon, and a second part (e.g., the second part 520 of FIG. 6) including a bent portion (e.g., the bent portion 521 of FIG. 6) extending from the first part into the at least one opening and formed to be bendable, and a contact point portion (e.g., the contact point portion 522 of FIG. 6) providing an electrical contact point with the printed circuit board.

According to various embodiments, the base member may provide an area to form the conductive pattern therein.

According to various embodiments, as the bent portion of the second part is bent, the contact point member may extend in a second direction opposite to a first direction in which the at least one opening faces, and form the contact point with the printed circuit board.

According to various embodiments, a position of the contact point member of the second part may be movable in a first direction in which the at least one opening faces and a second direction opposite to the first direction according to a bending degree of the bent portion.

According to various embodiments, the conductive pattern may include a loop antenna shape and be disposed to surround the at least one opening.

According to various embodiments, the first part of the base member may include a plate-shaped support area (e.g., the support area 511 of FIG. 6) and a first opening (e.g., the first opening 512*a* of FIG. 6) formed inside the first part, and a shape of the first opening may be variable according to a bending degree of the second part.

According to various embodiments, a first fixing hole (e.g., the first fixing hole 513 of FIG. 6) to fix the support area may be formed in part of the support area adjacent to the first opening.

According to various embodiments, the first part of the base member may include a plate-shaped support area (e.g., the support area 511 of FIG. 6), a first opening (e.g., the first opening 512*a* of FIG. 6) formed inside the first part, and a second opening (e.g., the second opening 512*b* of FIG. 6) formed spaced apart from the first opening, and a shape of the first opening may be variable according to a bending degree of the second part.

According to various embodiments, when viewed from above the base member, the second opening may be located inside the loop-shaped conductive pattern.

According to various embodiments, a second fixing hole (e.g., the second fixing hole 514 of FIG. 6) to fix the support area may be formed in part of the support area adjacent to the second opening.

According to various embodiments, the contact point portion of the second part may include a plurality of holes, and be electrically connected to a communication circuit and/or a control circuit by being coupled with a contact point member disposed in an area on the printed circuit board.

According to various embodiments, the conductive pattern may include a coil having a plurality of turns substantially parallel to one surface of the plate.

According to various embodiments, the conductive pattern forms a loop antenna, and the loop antenna is designed as at least one of an NFC loop antenna, an MTS loop antenna, or a loop antenna for wireless communication.

According to various embodiments, the base member may form a multi-layer circuit board structure, and the conductive pattern may be located in one area among layers forming the base member.

According to various embodiments, the electronic device may further include a display exposed toward a front surface of the electronic device, the plate may be disposed to face a rear surface of the electronic device, and the base member with the conductive pattern mounted thereon may be disposed between the printed circuit board and the plate.

An electronic device (e.g., electronic device 101 of FIGS. 1 to 4) according to various embodiments of the disclosure may include a housing (e.g., the housing 310 of FIGS. 2 and 3) including a plate (e.g., the rear plate 380 of FIG. 4), a printed circuit board (e.g., the printed circuit board 340 of FIG. 4) disposed in the housing, and a conductive pattern part (e.g., the conductive pattern part 500 of FIG. 6) including a base member (e.g., the base member 600*a* of FIG. 6) disposed substantially in parallel to the plate and a conductive pattern (e.g., the conductive pattern 500*b* of FIG. 7) disposed on the base member to face the plate and configured to generate a magnetic field. The base member may include a first part (e.g., the first part 510 of FIG. 6) having at least one opening formed thereon, and a second part (e.g., the second part 520 of FIG. 6) including a bent portion (e.g., the bent portion 521 of FIG. 6) extending from the first part to be exposed to the outside of the first part and a contact point portion (e.g., the contact point portion 522 of FIG. 6) providing an electrical contact point with the printed circuit board.

According to various embodiments, as the bent portion of the second part is bent, the contact point member may extend in a second direction opposite to a first direction in which the at least one opening faces, and form the contact point with the printed circuit board.

According to various embodiments, a position of the contact point member of the second part may be movable in a first direction in which the at least one opening faces and a second direction opposite to the first direction according to a bending degree of the bent portion.

According to various embodiments, the conductive pattern may include a loop antenna shape and be disposed to surround the at least one opening.

According to various embodiments, the at least one opening may include a first opening accommodating at least part of the second part and a second opening formed spaced apart from the first opening, and when viewed from above the base member, the second opening may be located inside the loop-shaped conductive pattern.

The above-described substrate with a conductive pattern disposed thereon and an electronic device including the same according to various embodiments of the disclosure are not limited by the foregoing embodiment and drawings. It will be obvious to those skilled in the art that many replacements, modifications, and variations can be made inside the technical scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing including a plate;
   a printed circuit board disposed in the housing;
   a conductive pattern disposed in the housing and configured to generate a magnetic field; and
   a base member extending substantially parallel to the plate,
   wherein the base member comprises:
      a first part having at least one hole formed thereon, and
      a second part including a bent portion and a contact point portion, the bent portion being bendable and extending from the first part into the at least one hole, the contact point portion providing an electrical contact point with the printed circuit board, wherein the base member comprises an area in which the conductive pattern is formed, and wherein the conductive pattern includes a loop antenna shape surround the at least one hole.

2. The electronic device of claim 1, wherein, as the bent portion of the second part bends, the contact point portion extends in a second direction, opposite to a first direction in which the at least one hole faces, and forms the electrical contact point with the printed circuit board.

3. The electronic device of claim 1, wherein a position of the contact point portion of the second part is based on a bending degree of the bent portion, the position of the contact point portion being movable in a first direction in which the at least one hole faces and a second direction opposite to the first direction according to a bending of the bent portion.

4. The electronic device of claim 1, wherein the first part of the base member includes a plate-shaped support area and a first hole formed inside the first part, wherein a shape of the first hole varies according to a bending of the second part, and wherein the shape of the first hole is based on a bending degree of the second part.

5. The electronic device of claim 4, wherein a first fixing hole fixing the plate-shaped support area is formed in part of the plate-shaped support area adjacent to the first hole.

6. The electronic device of claim 1, wherein the first part of the base member includes a plate-shaped support area, a first hole formed inside the first part, and a second hole spaced apart from the first hole, wherein a shape of the first hole varies according to a bending of the second part, and wherein the shape of the first hole is based on a bending degree of the second part.

7. The electronic device of claim 6, wherein, when viewed from above the base member, the second hole is located inside the conductive pattern, and wherein the conductive pattern includes a loop antenna shape.

8. The electronic device of claim 6, wherein a second fixing hole fixing the plate-shaped support area is formed in part of the plate-shaped support area adjacent to the second hole.

9. The electronic device of claim 1, wherein the contact point portion of the second part includes a plurality of holes, and wherein the contact point portion of the second part is electrically connected to at least one of a communication circuit or a control circuit by being coupled with a contact point member disposed in an area on the printed circuit board.

10. The electronic device of claim 1, wherein the conductive pattern includes a coil having a plurality of turns substantially parallel to one surface of the plate.

11. The electronic device of claim 1, wherein the conductive pattern forms a loop antenna, and wherein the loop antenna is at least one of a near field communication (NFC) loop antenna, a magnetic secure transmission (MST) loop antenna, or a loop antenna for wireless communication.

12. The electronic device of claim 1, wherein the base member forms a multi-layer circuit board structure, and wherein the conductive pattern is located in one area among layers forming the base member.

13. The electronic device of claim 1, further comprising:

a display exposed toward a front surface of the electronic device, wherein the plate faces a rear surface of the electronic device, and wherein the base member with the conductive pattern mounted thereon is disposed between the printed circuit board and the plate.

\* \* \* \* \*